United States Patent [19]

Hayden

[11] Patent Number: 5,030,959
[45] Date of Patent: Jul. 9, 1991

[54] ENHANCED AUTOMATIC BEARING INDICATOR SYSTEM

[75] Inventor: Edgar C. Hayden, San Antonio, Tex.

[73] Assignee: Southwest Research Institute, San Antonio, Tex.

[21] Appl. No.: 869,997

[22] Filed: Jun. 3, 1986

[51] Int. Cl.[5] .............................................. G01S 3/22
[52] U.S. Cl. .................................... 342/373; 342/427; 342/431; 342/440; 342/441; 342/442
[58] Field of Search ............... 342/373, 427, 368, 371, 342/372, 379, 382, 428, 423, 431, 440–444

[56] References Cited

U.S. PATENT DOCUMENTS

| | | | |
|---|---|---|---|
| 2,547,622 | 4/1951 | Cleaver | 342/441 |
| 3,757,341 | 9/1973 | Gilbo | 342/371 X |
| 3,798,647 | 3/1974 | Bailey | 342/458 |
| 3,939,477 | 2/1976 | Green et al. | 340/445 |
| 3,946,395 | 3/1976 | Kirchoff | 342/423 X |
| 3,990,076 | 11/1976 | Naidich | 342/91 |
| 4,163,978 | 8/1979 | Shepherd et al. | 342/440 |
| 4,197,652 | 4/1980 | Hofgen | 340/431 |
| 4,229,746 | 10/1980 | Charlton | 343/854 |
| 4,318,106 | 3/1982 | Luedtke | 342/440 |
| 4,331,958 | 5/1982 | Lacomme | 342/152 |
| 4,604,626 | 8/1986 | Stromswold | 342/423 X |
| 4,654,664 | 3/1987 | Morgan | 342/440 |
| 4,656,479 | 4/1987 | Kirimoto et al. | 342/94 |
| 4,658,256 | 4/1987 | Piele | 342/383 |
| 4,754,281 | 6/1988 | Donath | 342/417 |
| 4,760,399 | 7/1988 | Steinert | 342/427 |
| 4,766,437 | 8/1988 | Schmidt et al. | 342/368 |
| 4,809,012 | 2/1989 | Tong | 342/442 |

Primary Examiner—John B. Sotomayor
Attorney, Agent, or Firm—Gunn, Lee & Miller

[57] ABSTRACT

An improved apparatus and method for radio direction finding is set forth, the generic function of which is that of an "automatic bearing indicator" (ABI). The technique and apparatus are intended for use in association with an antenna system which provides two directional beams which are scanned azimuthally in synchronism and are accessible simultaneously at two separate ports. The first beam is characterized by a response pattern having two adjacent, equal, lobes separated by a single, simple, null. The second beam is characterized by a response pattern having a single lobe, aligned in angle with the null of the first beam. The two signals from the two ports of the antenna system are directed via a twin channel receiving means, phase difference and amplitude detection means, and analog to digital conversion means, to data processing means under control of an algorithm which exploits the properties of the phasor (complex number) ratio of the first signal to the second signal. Determination of the azimuthal direction of the incident radio wave is thereby enabled 1) with fewer scanning cycles (typically one), 2) with greater independence from any intentional modulation on the signal, and 3) with improved accuracy in the presence of multi-component (multi-path) incident radio wave fields.

13 Claims, 2 Drawing Sheets

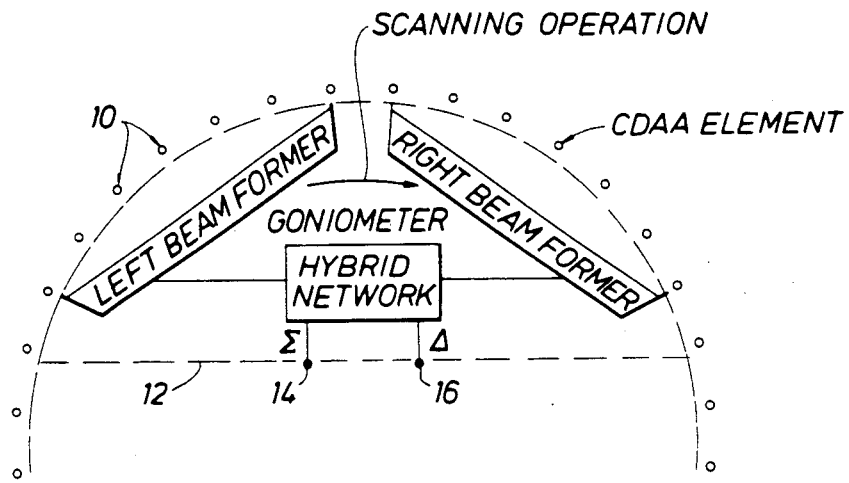
FIG.1 CDAA AND GONIOMETER CONFIGURATION
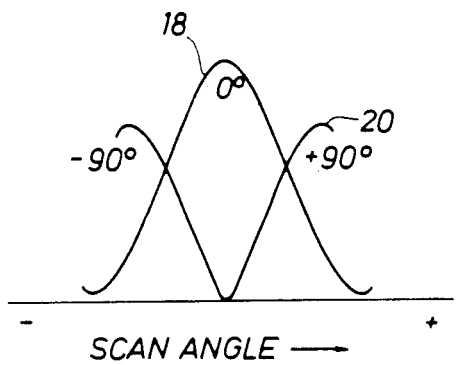
FIG.2
DIFFERENCE AND SUM
BEAM PATTERNS
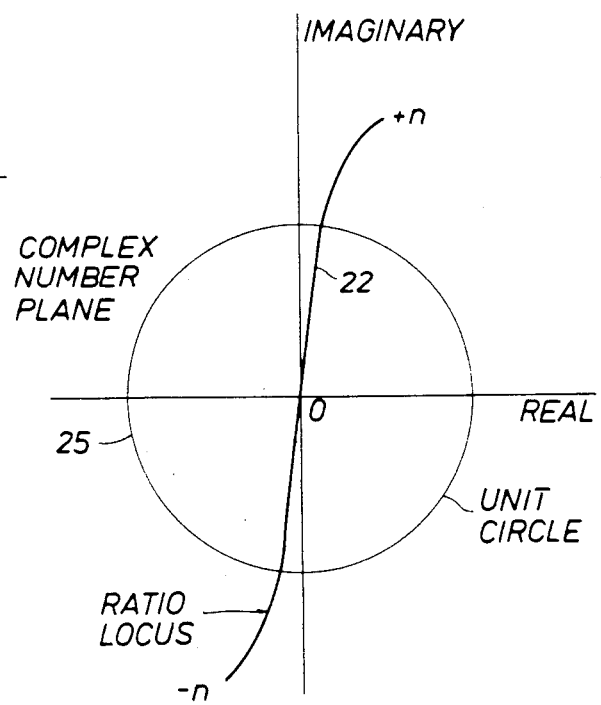
FIG.3 RATIO LOCUS

ENHANCED AUTOMATIC BEARING INDICATOR SYSTEM

BACKGROUND OF THE DISCLOSURE

An improved apparatus and method for radio direction finding (DF) is set forth, the generic function of which is that of an "automatic bearing indicator" (ABI).

The automatic bearing indicator system and algorithm here presented are directed to improvement of the performance of a class of radio direction finding (DF) systems. The class of DF systems is characterized by an array of antenna elements (the antenna array) to which is connected a beam forming/scanning network (the beam scanner or goniometer), the whole arranged to produce directive beams which can be scanned over some range of azimuth angle, possibly a full 360°. Typically a beam complex comprising two beams which are scanned in synchronism is, or can be, produced. One of the beams in the complex is characterized by a principal response pattern exhibiting two lobes separated by a single, simple null; this beam is commonly called the "difference" beam after the manner of its derivation. It is used, typically, to determine the bearing of the incident radio wave by noting the beam scan angle for which the response to the incident signal is at the bottom (or minimum) of the pattern null. The other beam in the beam complex is characterized by a principal response pattern exhibiting a single lobe, aligned in angle with the null of the difference beam; this beam is commonly called the "sum" beam after the manner of its derivation. It is generally used for purposes ancillary to the DF function. The antenna system is exemplified by, but not limited to, that circularly disposed antenna array (CDAA) and beam scanner (goniometer) frequently called the "Wullenweber" direction finding system.

If the radio signal being received comprises a simple unmodulated carrier, then the scanning process produces beam responses representing the true beam patterns which are characteristic of the antenna array and beam scanner combination. However, most radio signals have intentional modulation impressed on the carrier, the modulation serving to convey the information transmitted by the radio transmitter. The modulation causes the beam responses produced by the scanning process to be modified with the modulation impressed on them so that they no longer simply represent the true beam patterns characteristic of the antenna array and beam scanner. Since the modulation processed carrier is sometimes more or less completely suppressed, the modification of the beam pattern can be quite severe. In all events, the presence of the intentional modulation on the signal tends to obscure or mimic those features of the beam patterns on which determination of the bearing depends.

Additionally and independently, there exist various mechanisms of radio wave propagation which very frequently cause transmission of a radio signal to a DF site by multiple paths. As a result of the multi-path mode of transmission, a multi-component radio wave is incident on the DF antenna array, the various components arrive from somewhat different directions. Typically, the aperture of the antenna array is insufficient (for reasons of economics or site limitations) to allow angular resolution of the several components so that the bearing of each arriving radio wave may be determined separately. The consequence is that the beam scanning process produces beam response patterns which are combinations (superpositions) of the separate responses to each of the individual multi-path components. Even if the signal is a simple unmodulated carrier, responses derived from superposed waves are not true representations of the beam patterns characteristic of the antenna array and beam scanner. The beam pattern distortion so engendered does from time to time degrade or destroy the bearing indication and may cause it to be erroneous; it may, for example, cause the null in the difference beam response to be filled in, to appear at an erroneous location, or to split into two false nulls. The presence of the distortion is characteristic of the existence of the multi-component condition and its nature admits selection of circumstances when the probability of its effect on bearing accuracy is reduced.

Presently, a class of automatic bearing indicator (ABI) devices used in conjunction with Wullenweber/CDAA systems makes use of the split-lobe pattern only. These devices attack the problems engendered by the intentional modulation on the signal by combining the responses produced by several (typically eight or more) stored successive scan cycles to construct a single composite response. As a consequence of the point-by-point averaging of the several accumulated responses, a composite response is produced in which the effects of the intentional carrier modulation are mitigated. However, in the process of mitigating the effects of the intentional modulation, the distortion characteristic of the multi-component condition also is blurred or smeared, significantly degrading its value for indicating the probability that the bearing indication may be either correct or erroneous. The composite response is subjected to a procedure which tests the symmetry of the composite pattern and attempts to determine the existence, location and quality of a null from the composite pattern as a means of determining the bearing. Note that, even when the attempt is successful, such an ABI system can in no case return a bearing value in less than the number of scan cycles required to construct the composite response.

BRIEF SUMMARY OF THE PRESENT DISCLOSURE

The subject apparatus has its basis in an improved technique for performing the ABI function for the class of DF systems exemplified by the Wullenweber/CDAA system. Because of the enhancements it provides relative to prior ABI practice, it may be referred to as an enhanced automatic bearing indicator (EABI) system. The EABI system and requisite algorithm make simultaneous use of both the difference and the sum beam response patterns in a particular manner. Note that the beam scanner is typically so constructed, or can be so constructed, that the sum beam is aligned with the null of the difference beam in azimuth angle and covers generally the same range of scan angle as is encompassed between the maxima of the two lobes in the difference beam. The two beams are, or can be made, simultaneously accessible at two separate output ports of the antenna system.

The two signals from the two ports of the antenna system (specifically from the beam scanner) are directed via a twin channel receiver to a measurement means which determines the amplitudes of the two signals, and also the difference in phase between them, at a sequence of points distributed throughout the scanning cycle.

The sequence of sets of three measurements so generated is supplied to a data processor means (computer) under control of an algorithm (program) which exploits the properties of the phasor (complex number) ratio of the difference signal to the sum signal over a scanning cycle. In general, the same intentional modulation is present on the sum beam signal as on the difference beam signal. If there is constructed by the process of phasor (complex number) division the phasor ratio of the difference beam response signal to the sum beam response signal (this being done from point to point throughout the scanning cycle), the effects of the intentional modulation present in both the numerator and the denominator of the ratio function fraction will tend to cancel out. By this means the effects of the intentional modulation on the response signal can be mitigated on a scan by scan basis, eliminating the necessity to construct a composite response signal from several scans. The distortion characteristic of the existence of a multi-component condition, being a consequence of the spatial distribution properties of the multi-component field rather than a consequence of the temporal properties of the intentional modulation impressed on each component of the field, is not the same on the sum beam signal as it is on the difference beam signal. In construction of the phasor ratio function, the distortion due to the multi-component condition is not thereby destroyed or degraded as it is in the formation of a composite response from several successive scans. Rather, it is transformed into a format in which the distortion is easily discernible and which is particularly amenable to further processing for quality evaluation and bearing determination. The bearing is determined by noting the point in the scan cycle at which the phasor ratio function, plotted as a locus on the complex number plane, approaches most closely to the origin of coordinates in the plane. This point of the scan cycle corresponds very closely to the location of the null of the difference pattern. The acceptability of the plot is determined by an evaluation of the ratio locus in the neighborhood of the complex number plane origin, specifically on and within the circle of unit radius centered about the origin. Thus the EABI system and related algorithm offers, at least, the following enhancements with respect to prior ABI practice: 1) the determination of a bearing value with fewer scanning cycles (typically one) and thereby in a shorter time period, 2) greater independence from the deleterious effects of intentional modulation on the signal and 3) improvement in probably bearing accuracy in the presence of multi-component (multi-path) incident radio waves.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification.

It is to be noted, however, that the appended drawings illustrate only typical embodiments of the invention and are not to be considered limiting of its scope, for the invention may admit to other equally effective embodiments.

FIG. 1 is an antenna system comprising a circularly disposed antenna array (CDAA) of which only a portion of the elements are illustrated and a "goniometer" for forming and scanning directive beams derived from a variable subset of the elements of the antenna array. This system is frequently called the "Wullenweber" or "Wullenweber/CDAA" DF antenna system;

FIG. 2 is a plot of output signal amplitude versus scan angle where the portion of the scan angle range encompassing the principal lobes of the response patterns is illustrated for the two signals provided by the antenna systems, and where nominal values for the relative phase of the various lobes of the response patterns are indicated on the plot;

FIG. 3 is a plot on the complex number plane of the ratio function derived by phasor (complex number) division of the "difference" signal of FIG. 2 (the two-lobed response pattern) by the "sum" signal of FIG. 2 (the one-lobed response pattern); this plot, which is a parametric function of scan angle, may be referred to as the "ratio locus"

DETAILED DESCRIPTION OF THE PREFERRED EMBODIMENT

Figure 4:
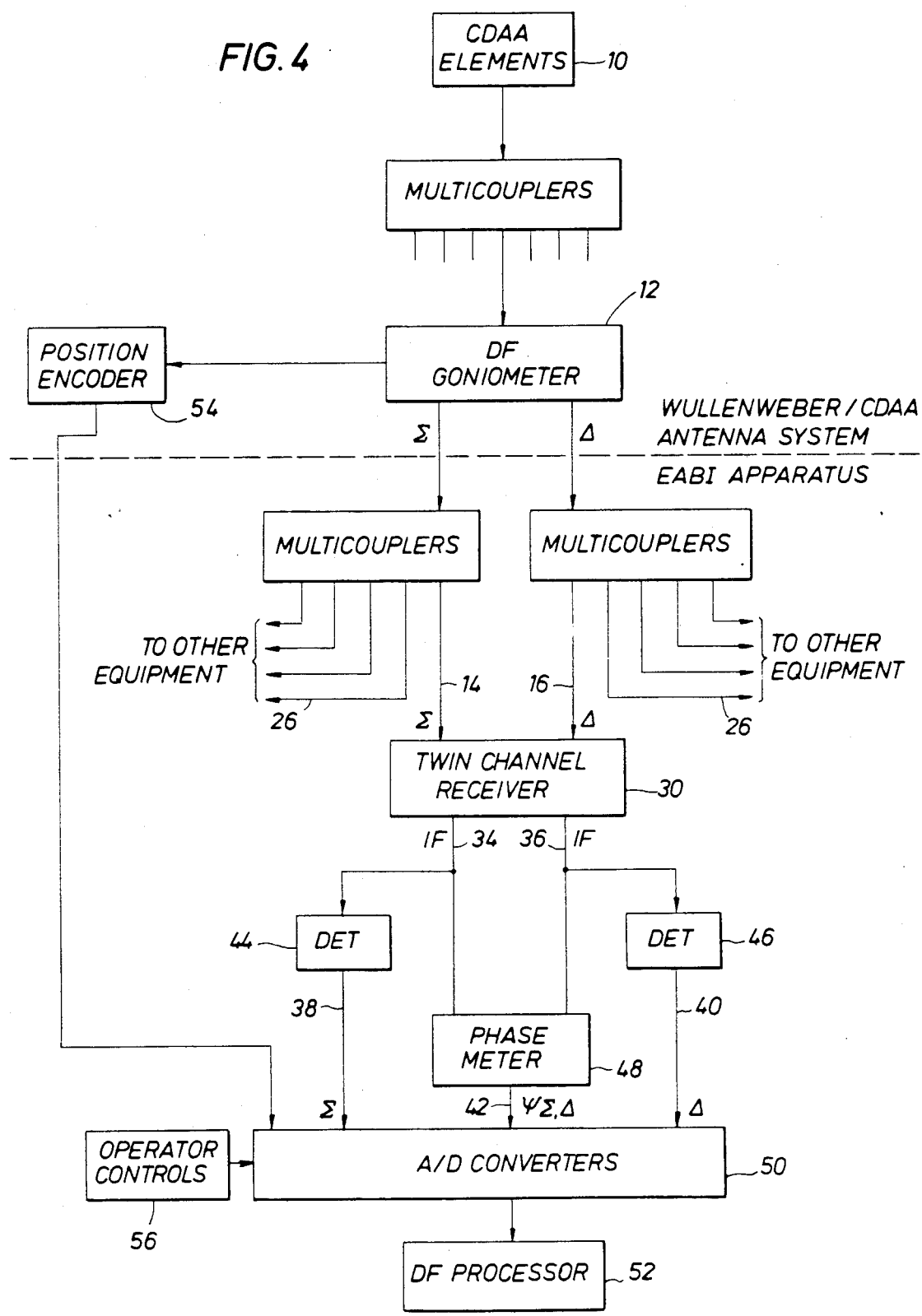
FIG. 4 is a schematic block diagram of the enhanced automatic bearing indicator (EABI) apparatus connected to the Wullenweber/CDAA antenna system.

Attention is first directed to FIG. 1 of the drawings in which the numeral 10 identifies an array of antenna elements. These elements may be deployed around a full circle or a substantial part of a circle, perhaps in association with other elements or screens which serve as reflecting devices to control the directive properties of the individual antenna elements. Such a circularly disposed antenna array (CDAA) is frequently called a "Wullenweber" antenna array when used in the manner to be described. Each of the elements, which need not be identified individually, serves as a source of signal derived from an incident radio wave, the several antenna output signals being fed to a beam forming and scanning device frequently called a "goniometer"; this device is identified in FIG. 1 by the numeral 12. In this device, signals from a subset of the entire set of elements are combined in a manner which generates directive signal reception referred to as a "beam pattern". In FIG. 1 this function is performed by two beam formers, a left-handed and a right-handed pair, in association with a hybrid network. The hybrid network in the beam former/scanner, or goniometer, has two ports, identified by the numerals 14 and 16 in FIG. 1, from which signals are available for external use. The goniometer 12 is also provided with means by which the subset of elements 10 used to form the beam patterns can be moved to successive positions around the circle, thereby "scanning" the beam patterns in azimuth angle relative to the array. The total system comprising the antenna array 10 and the goniometer 12 arranged in the manner described is frequently called a Wullenweber/-CDAA DF antenna system.

For purposes of general description of the two signals, accessible at the ports 14 and 16 in FIG. 1, attention is next directed to FIG. 2. There, the two signals are depicted as functions of the beam scan position in azimuth angle or, simply, scan angle. It is assumed in this description that the radio wave incident on the antenna array 10 comprises only a simple unmodulated carrier signal. The two curves represent the amplitude, or strength, of the two signals. The nominal values of the relative phase of the signals are marked on the plot under the several lobes of the two curves. The curve identified by the numeral 18, which depicts the signals accessible from the port 14 in FIG. 1, is called the "sum" signal because the hybrid network constructs it by summing the signals from the two beam formers; it is characterized by a single lobe to which the instantaneous phase value 0° is assigned for reference purposes. The curve identified by the numeral 20, which depicts the signal accessible from the port 16 in FIG. 10, is called the "difference" signal because the hybrid network constructs it by differencing the signals from the two beam formers; it is characterized by two lobes which differ in phase by the nominal value of 180° and which are separated by a simple null. The nominal phases of the two lobes of the difference signal differ by +90° and -90° respectively from the reference value assigned to the lobe of the sum signal 18. Note that the phase values given for the several lobes are nominal values; some moderate departure from these values is to be expected as the scan angle varies. Note also that the lobe of the sum beam pattern 18 is centered over the null of the difference beam pattern 20. It should be understood that the scan angle depicted in FIG. 2 encompasses only the principal responses of the beam patterns, and not the entire 360° range of azimuth angle.

As explained in the brief summary of the present disclosure, an important feature of the EABI system is the manner in which the two signals depicted in FIG. 2 are utilized. By the process of phasor (complex number) division, the phasor ratio of the difference beam response signal 20 to the sum beam response signal 18 is constructed, this being done from point to point throughout the scan angle encompassing the principal beam response patterns. The result of this construction is illustrated in FIG. 3 in which the phasor ratio function is plotted on the complex number plane. The plot of the function, identified in FIG. 3 by the numeral 22, is a parametric function of the scan angle; it may be called the "ratio locus". Note that the null of the difference pattern in FIG. 2 is transformed into the point of the ratio locus which lies at the origin of coordinates in FIG. 3. Note also that the points in FIG. 2 at which the sum and difference patterns intersect, or are equal in value, are transformed into the intersections at which the ratio locus 22 crosses the unit circle 25 in FIG. 3. The bearing is determined by noting the value of the scan angle at which the ratio locus most closely approaches the origin of coordinates in FIG. 3; in the case illustrated, it actually coincides by crossing at the origin. The acceptability of the data is determined by noting the distance by which the ratio locus 22 misses the origin (whenever it does) and by noting the angular amount by which the two crossings of the ratio locus 22 with the unit circle 25 fail to lie directly opposite one another. If these two measures are both less than certain established criteria, then the data from that scan are deemed acceptable for bearing determination; otherwise, the data are deemed unacceptable and may be disregarded or diverted to other ends.

In FIG. 4 a particular embodiment of a system for performing the EABI operations described above is shown in schematic form. The Wullenweber/CDAA DF antenna system is shown at the top, identified as before by the numerals 10 and 12. Note that there is associated with the goniometer 12 a position encoder identified by numeral 54. The function of this device is to provide signals indicative of the scan angle from time to time in the scanning cycle to be used for coordinating the data acquisition process. The devices labeled "multicouplers" are ancillary equipment used to replicate signals so that multiple systems can be served by a single source; they are common station equipment but serve no significant purpose in the context of this disclosure. Two multicouplers are shown replicating the signals from the ports 14 and 16 of FIG. 1 for use by the EABI system and, at numeral 26, for use by other systems.

The signals derived from the ports 14 and 16 are input to a twin channel receiver 30. A twin channel receiver is used so that the two signals can be used simultaneously. The two receiver channels are matched and synchronized so that the amplitude and phase relationships between the two signals will be preserved during passage through the receiver amplifier stages. The receiver output is typically at an intermediate frequency (IF) level. Each of the two receiver output signals, at numerals 34 and 36, is fed to an amplitude detector, at numerals 44 and 46, respectively. These detectors produce baseband analog signals 38 and 40 representative of the amplitude of the IF signals. The two receiver channel outputs are also fed to a phase meter (phase detector) at numeral 48 which produces a baseband analog signal 42 representative of the difference in phase between the two IF signals. These three quantities (the two amplitudes 38 and 40 and the phase difference 42) provide the data required to construct the phasor ratio function described above and illustrated in FIG. 3. The three analog baseband signals 38, 40 and 42 are fed to a bank of three analog to digital (A/D) converters 50.

A signal display associated with the operator control station 56 allows specification of a scan angle value derived from the position encoder 54 signals, about which the principal response patterns are spread. This specification procedure permits selection of the response patterns associated with a particular desired incoming signal when response patterns associated with other signals at other azimuth values are also present in the receiver output signals. When commanded from the operator control station 56, the DF processor 52, which contains a central processing unit (CPU) or computer, establishes a sampling sequence derived from the position encoder signals, the operator selected scan angle value and other programmed parameters. The sampling sequence defines a set of values of the scan angle which selectively encompass and adequately delineate the principal response patterns. Under control of the DF processor 52, the A/D converters sample simultaneously the three signals 38, 40 and 42 at each of the specified set of scan angle values, thereby generating a sequence of sets of three sample values which are saved in digital form for further processing.

Using a sequence of triplet sample sets derived from a single scan cycle, the DF processor constructs the ratio locus described in connection with FIG. 3. Because the ratio locus so derived is stated empirically (i.e., in the form of a table of numbers) rather the analytically (i.e., in the form of a formula), it is convenient to substitute for it a carefully fitted surrogate analytic function to facilitate further processing. The properties of the Gram orthogonal polynomials have proved suitable for this purpose. Using the surrogate function, the acceptance tests described above in connection with FIG. 3 are applied by the DF processor and, if passed, the bearing value is determined by the DF processor by application of the definition described in connection with FIG. 3.

The procedure (algorithm) described above is repeated on each successive beam scan cycle. The bearing values derived from successive scan cycles are saved for further disposition. They may be presented graphically on a CRT display for immediate observation and interpretation, transmitted to a supervisory operator position for operational use, or accumulated on storage media for other uses such as statistical analysis, tabular printing or graphical reproduction for off-line observation and interpretation.

While the foregoing is directed to the preferred embodiment, the scope thereof is determined by the claims which follow.

What is claimed is:

1. Apparatus for providing improved direction finding performance on antenna systems comprising:
   (a) an array of CDAA antenna elements deployed in a Wullenweber configuration for responding to a remote transmitter source;
   (b) an output circuit cooperatively connected to said antenna elements wherein the antenna elements and output circuit comprise an antenna system providing first and second output signals representing
      (1) a single lobe directional pattern,
      (2) a split lobe directional pattern exhibiting two lobes approximately 180° out of phase, and
      (3) wherein said output circuit scans the directional patterns in azimuth;
   (c) matched twin receiver means provided with said first and second antenna output signals and forming two output signals therefrom;
   (d) phase detector means connected to the two outputs of said receiver means for forming a phase difference signal;
   (e) first and second amplitude detector means connected to the two outputs from said receiver means for forming amplitude signals derived from said single lobe pattern signal and said split lobe pattern signal; and
   (f) data processing means provided with signals from said phase detector means and said first and second amplitude detector means, said processing means evaluating the signals against specified criteria based on phasor ratio locus in complex plane for acceptability and, whenever acceptable, determining the azimuthal direction of a signal source wherein the direction is determined within a specified range of azimuth dependent on said antenna array.

2. The apparatus of claim 1 wherein said phase detector means measures the phase difference between signals representing said single lobe and split lobe patterns.

3. The apparatus of claim 1 wherein said amplitude detector means measure the amplitudes of the two signals representing said single lobe and split lobe patterns.

4. The apparatus of claim 1 wherein said data processing means comprises analog to digital conversion means converting analog input signals thereto into digital signals, and further comprising CPU means provided with said digital signals as an input for determining azimuth of a signal source.

5. The apparatus of claim 4 including antenna angle encoder means connected to said antenna output circuit for forming a signal indicative of scan angle value.

6. The apparatus of claim 4 including means for representing the output signals from the single lobe and split lobe patterns as complex numbers.

7. The apparatus of claim 4 including means for evaluating a phasor ratio locus of output signals representing said split lobe and single lobe patterns on the complex number plane.

8. The apparatus of claim 4 including means for rejecting measured values or determination that features of the ratio locus exceed specified permissible error criteria.

9. A method for determining azimuth of a signal source relative to an antenna system comprising the steps of:
   (a) forming right and left beam components from a CDAA antenna array of the Wullenweber configuration;
   (b) converting beam components into single lobe and split lobe antenna output signals;
   (c) obtaining the phasor ratio locus in a complex phase of the split lobe and single lobe antenna output signals;
   (d) evaluating the phasor ratio locus in a complex plane against selected criteria to determine acceptability of the data; and
   (e) determining azimuth of the signal source after determining acceptability of the data.

10. The method of claim 9 wherein the step of obtaining the phasor ratio forms a sequence of complex number ratios for a cycle of scanning of the antenna output signals.

11. The method of claim 10 including the step of evaluating the sequence of complex number ratios as a locus on the complex plane, and evaluating features of the locus against specified criteria for acceptability.

12. The method of claim 11 including the step of determining the point of minimum offset of the locus of the complex number ratios on the complex plane from the origin thereof for determining signal source azimuth.

13. The method of claim 12 wherein the step of determining azimuth includes the preliminary step of determining azimuth direction of the scanned beam from a position encoder on a goniometer.

* * * * *